March 30, 1948.  W. FEINBLOOM  2,438,743
TANGENT CONE CONTACT LENS
Filed Dec. 15, 1945
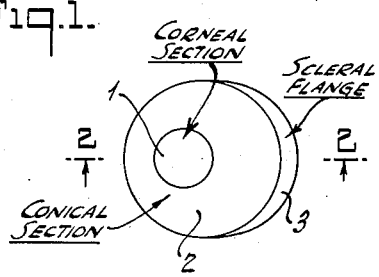
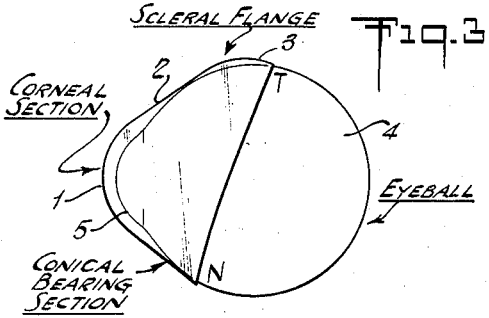
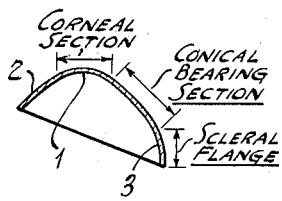
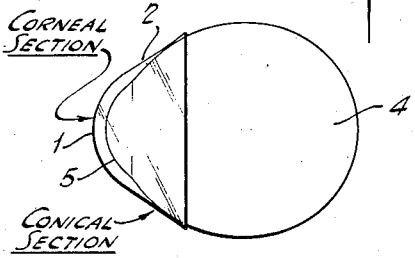
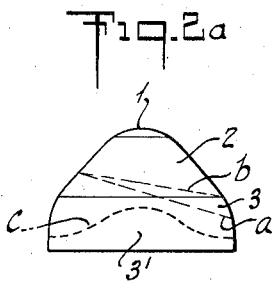
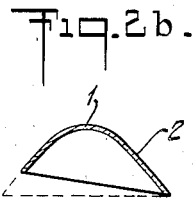
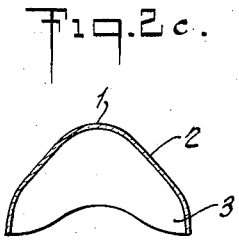
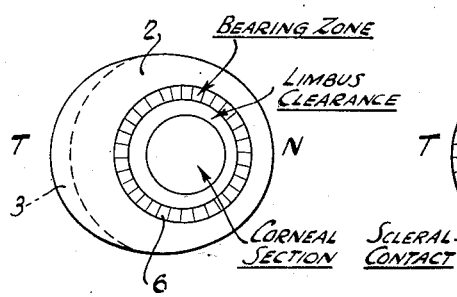
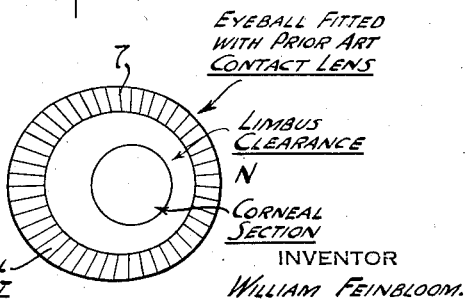
INVENTOR
WILLIAM FEINBLOOM.
BY
Abraham S. Greenberg
ATTORNEY Patented Mar. 30, 1948

2,438,743

UNITED STATES PATENT OFFICE 2,438,743

TANGENT CONE CONTACT LENS

William Feinbloom, New York, N. Y.

Application December 15, 1945, Serial No. 635,254

7 Claims. (Cl. 88—54.5)

My present invention relates in general to contact lenses, and more particularly to an improved all-plastic contact lens referred to hereinafter as a "tangent cone" contact lens.

In my U. S. Patent Nos. 2,129,304; 2,129,305; 2,178,873 and 2,196,066 I have shown glass and plastic contact lenses adapted to overcome visual difficulties, and to replace ordinary spectacles when these prove undesirable. Briefly, the glass lens (the corneal section) is worn in intimate contact with the eyeball, with only a layer of water between the lens and cornea. Thus, the lens in effect forms an artificial cornea, and its optical power corrects the errors in vision. A molded plastic rim (scleral portion) holds the glass lens in the proper position before the eye. The molded plastic rim, or scleral section, generally is sought to contact the sclerotic, or white, part of the eye. Even in the case of other types of contact lenses, as the ground and blown types, it is sought to have the scleral rim or section closely conform to the contour of the eyeball.

Contact lenses constructed in accordance with my aforesaid patents provide for the bearing surface of the lens to consist of the area extending from the outermost edge of the scleral rim to from one-third to one-half towards the corneal section. I have found from actual experience with patients wearing contact lenses that there develops highly undesirable pressures on the eyeball with the passage of time. These pressures, which give rise to undesirable physiological effects, can only be ascribed to the fact that the scleral section of these prior contact lenses closely conform to the sclerotic part of the eyeball. Considerable investigation and experimentation have caused me to come to the conclusion that tolerance of the wearer to a contact lens can only be increased by decreasing the area of the bearing zone between the scleral rim and the eyeball.

Accordingly, it may be stated that it is one of the main objects of my present invention to provide a contact lens which is differentiated from all prior contact lenses in that the bearing surface between the lens support element and the eyeball is minimized. In accordance with my present invention, I replace the usual scleral rim by a conical bearing section which is adapted to provide a circle of bearing contact with the eyeball, whereby pressure on the eye is minimized.

In the prior plastic-glass contact lens the mode of fabrication was such that there existed a zone of transition that was "discontinuous" at the junction of the corneal and scleral sections, and the eyeball could feel such discontinuity and thereby create nervous tension in the wearer. In accordance with another, and important, object of my invention I have provided a contact lens which is produced in such a form that there is complete continuity between the corneal section and the conical bearing section on the inner surfaces whereby the eyeball does not feel a "break" in the inner surface of the contact lens. In my present contact lens the inner face is smooth, and offers no obstacle to the eyeball as it rolls.

It has been found that to cover the range of all possible eyeball formations, approximately 400 lenses are required for the fitting of the prior plastic-glass contact lenses. In accordance with my present invention, I have provided a type of contact lens which requires but twenty to twenty-five lenses to provide fitting of all possible types of eyeballs.

A more specific object of my present invention is to provide a tangent cone contact lens which automatically seals against air bubbles, and, further, wherein the edges of the conical bearing surface are not capable of digging into the eyeball.

Other objects, features and advantages of the invention will appear from a reading of the following detailed description which is accompanied by a drawing.

In the drawing:

Fig. 1 is a plan view of an embodiment of a contact lens constructed in accordance with my present invention;

Fig. 2 is a vertical section of the lens taken along line 2—2 of Fig. 1, looking in the direction of the arrows;

Fig. 2a is a front view of a plastic blank from which the contact lenses of Figs. 2, 2b and 2c are cut;

Fig. 2b is a vertical section through a lens cut from the blank along dotted line b of Fig. 2a;

Fig. 2c is a vertical section through a lens cut from the blank along dotted line c of Fig. 2a;

Fig. 3 illustrates schematically the contact lens of Fig. 2 mounted in operative position on an eyeball, the eyeball being viewed in plan from the skull;

Fig. 4 shows the same eyeball as in Fig. 3, but viewed from the nasal side N;

Fig. 5 shows the front view of the fitted eyeball of Figs. 3 and 4; and

Fig. 6, by contrast, shows the appearance of the same eyeball when fitted with a contact lens of the prior art.

Referring now to the accompanying drawing, wherein like reference characters in the several figures denote similar structural elements, attention is first directed to Figs. 1 and 2 which show a tangent cone contact lens embodying my present invention. In general, the lens is composed entirely of a plastic material. Basically, there are three sections to the contact lens. The corneal section 1 extends over a predetermined (approximately 12 mm.) inside corneal chord. However, this chord length may be varied. Immediately adjoining the corneal section 1 is a conical bearing section 2 which extends down from the corneal portion. The angle of the conical section 2 to the vertical may be chosen from a predetermined range of angles (say 43° to 49°). My invention is not restricted to these values. Adjoining the section 2 in the temporal quadrant is a curved scleral flange 3 which varies in radius of curvature over a predetermined range of values. The function of the scleral flange, or tail, 3 is to keep the upper and lower eyelids from rubbing against the edge of the conical section 2 on the temporal side. The contact between the scleral flange and the sclera of the eye should be one varying from complete clearance to one of just bare contact. The desired choice is easily made, because any blanching of a blood vessel is readily observed. The section 3 is not a part of the bearing surface.

The contact lens is produced from any suitable synthetic plastic material adapted to be impervious to the fluids of the eye. I prefer to use a transparent plastic material which can be molded in the desired configuration as a thin, rigid contact lens. For example, the materials sold under the trade-marks "Lucite" and "Plexiglas" are well suited for my purpose. Preferably, the scleral flange is originally a spherical section depending from the conical section 2. The flange and conical sections are easily cut into any desired shapes by slicing diagonally across the sections.

Examination of the lens section of Fig. 2 reveals that there is perfect continuity, or smooth flow along the inner surface from the corneal section 1 to the conical section 2. There exists no "break" or "discontinuity" at the zone of transition or junction, between the corneal and scleral sections, as was the case in the prior contact lens. In the prior glass-plastic lens, a radius of the scleral rim met the radius of the corneal section, always leaving an area or zone of discontinuity on the inner surface which the eyeball could feel. From Fig. 2 it will be seen that the smooth and continuous transition from the corneal section to the conical section 2 leaves substantially no disturbing factor for the eyeball. This is an important improvement in the present construction over prior contact lenses, since the eyeball will not bump into any obstruction as it rolls along.

Attention is now directed to Fig. 2a which shows the front view of a blank from which is readily cut, by any suitable and known cutting apparatus, contact lenses of the forms shown in Figs. 2, 2b and 2c. The dotted lines a, b and c in Fig. 2a denote respectively different cutting planes transverse to the vertical axis of the blank. The blank has the corneal section 1, the conical section 2 and the flange section 3'. The latter is actually a transverse section of a sphere. The transverse junction lines of the sections are somewhat exaggerated so as to emphasize the existence of the three sections. The corneal section 1 may be formed with its outer radius variable to provide optical correction. If desired, the corneal section 1 may be lenticular.

The lens of Figs. 1, 2 may be formed by laterally cutting through the blank along the line a. It will be noted that the cutting plane a angularly intersects the plane of the base of conical section 2. The residual scleral flange 3, then, becomes the temporal side of the lense. Obviously, the angle of intersection of the cutting plane and the plane of the base of conical section 2 may vary.

It may be desirable at times to cut the blank along line b. In that case the flange section 3' is entirely eliminated. The longer side of the conical section 2 would then act as the temporal side. Fig. 2b shows a vertical section through a contact lens cut from the blank along line b. The dash lines in Fig. 2b indicate the lower portion of the conical section 2 which was cut away.

There may be cases where both nasal and temporal flanges are desired for the lens. An illustration of such a lens is shown in Fig. 2c, which shows a vertical section through a lens cut along line c of Fig. 2a. Suitable cutting apparatus exists for providing the cutting pattern represented by line c.

In the various embodiments shown in Figs. 2, 2b and 2c it can be stated that practically the entire area of the lens peripheral to the corneal section is of conical configuration.

Attention is now directed Figs. 3 and 4 which show the contact lens operatively mounted on an eyeball 4. The numeral 5 denotes the cornea of the eye. In Fig. 3 I have shown an idealized or schematic plan view of the eyeball, the latter being shown in Fig. 4 in its meridian of short radius. In other words, Fig. 3 shows the contact lens fitted to the eyeball, and viewed downwardly from the skull. The letter T denotes the temporal side, while N denotes the nasal. Fig. 4 shows the nasal aspect. It will be noted that the conical section 2 is tangentially related to the eyeball. The term "tangent" is used in the description and claims to indicate an ideal condition. Actually there exists an approximate tangency. Even though the eyeball is definitely irregular in many meridians, or even in the same meridian, the cone lens will touch on some point in almost every meridian, because the curvature of the eye in any meridian grows less, i. e., the radius is longer as the distance from the cornea increases. There is practically never a point of inflection beyond the first few millimeters beyond the cornea. In Fig. 5 I have portrayed the front view of the fitted contact lens. The tangential bearing zone, or circle, is indicated by numeral 6 as a shaded area.

The inner bearing surface of the conical section 2 is about one-third up from the edge. This permits for "rolling" friction as the eye moves. Theoretically, the tangent conical section 2 should provide a "circle line" contact at the successive points where the section 2 meets the eyeball. However, the globe of the eye, which is fairly hard, is covered by a very soft, flexible, inelastic tissue (the bulbar conjunctiva) which gives under the lens. The tissue flattens to form the narrow zone 6, instead of a theoretical line. However, the narrow bearing zone 6 reduces to a minimum the sum total of all pressures on the eyeball 4 which are produced from the weight and muscle pressure of the eyelids, as well as the weight of the contact lens and the enclosed water. These extremely important results are secured by having the conical section 2 bear tangentially on the eyeball at narrow zone 6. A marked increase in the wearing period of the contact lens results. The eyeball can readily tolerate the lens for very much longer periods than in the case of prior contact lenses.

In Fig. 6 I have depicted, by way of contrast, the front view of an eyeball fitted with a contact lens of the prior art. Both Figs. 5 and 6 indicate by T and N the temporal and nasal sides. The bearing zone of the scleral portion in Fig. 6 is not only at the rim edge, but exists up towards the corneal section for at least one-third the length of the scleral rim. The shaded area 7 shows the large bearing surface, and why undesirable increase of pressure occurs when wearing the prior contact lens for long periods. Hence the eyeball has been relieved of much of this scleral pressure when employing my present invention.

The existence of the narrow bearing zone 6 is readily demonstrated with a contact lens of my invention. The contact lens is inserted, except that one drop of fluorescein is added to the contents of the lens. The room is darkened, and the eye is illuminated with a violet light source. It will be observed that a non-fluorescent, narrow circular zone 6 exists between the fluorescent limbus clearance and the fluorescent area concentric to zone 6. This indicates that the lens bears on the eyeball at solely zone 6. A similar test with a prior contact lens shows the wide zone 7 of Fig. 6 to be non-fluorescent.

An additional advantage of the present tangent cone contact lens resides in its automatic liquid-sealing characteristic. If we assume the eye to be irregular in shape, but approximated by a toric surface or ellipsoid, paraboloid etc., then a conical surface can be so chosen that it will touch the eyeball surface at some point along the cone in every single meridian. If contact is not secured for every meridian, then air bubbles result. Since the space between the corneal section and the tangential zone 6 is desired completely to be filled with liquid (tears, etc.,) it follows that each meridian must be sealed against loss of liquid. This prevents air bubbles from interfering with vision. In the prior contact lenses it has been difficult to seal against air bubbles.

Further advantages of the present construction include the fact that the edge of the conical section 2 cannot dig into the ball 4, and the important advantage that approximately 20 to 25 lenses of the present type (suitably arranged and proportioned) are sufficient to cover the range of all eyeballs. This should be compared to the prior contact lens, which requires some 400 lenses to cover the same range.

It should be distinctly understood that the foregoing description has been disclosed as illustrative and not as a limitation of the invention, since various changes may be made by one skilled in the art. For example, I am not restricted to any specific plastic materials, nor need the entire lens be transparent. The sections other than the corneal section 1 may be of white pigmentation to match the sclera of the eyeball.

What I claim is:

1. A contact lens comprising a corneal lens section, a conical scleral bearing section and a scleral flange, said sections and flange being a single unit, practically the entire area of the lens peripheral to the corneal section being of conical configuration, said conical section being shaped so as tangentially to bear on the sclera of the eye along a relatively narrow circular zone, and said scleral flange being constructed and arranged to keep the upper end lower eyelids from rubbing against the edge of the conical section on the temporal side.

2. An all-plastic contact lens having a conical scleral bearing section, a corneal lens section provided as a smooth and continuous extension of the conical section on the inner surface, whereby the eyeball cannot feel any discontinuity between the lens section and scleral bearing section on the inner surfaces thereof and practically the entire area of the lens peripheral to the corneal section being of conical configuration.

3. A contact lens consisting of a corneal section, a conical scleral bearing section extending down from the corneal section, a curved scleral flange depending from the conical section, and said conical section being shaped so as tangentially to bear on the sclera of the eye and practically the entire area of the lens peripheral to the corneal section being of conical configuration.

4. A contact lens, adapted to be fitted directly on an eyeball, comprising a corneal lens section, a conical scleral bearing section and a scleral flange all formed as an integral plastic unit free of discontinuities on the inner surfaces thereof said contact lens having substantially its entire area peripheral to its corneal section of conical configuration.

5. A plastic blank, from which a contact lens is adapted to be cut, comprising a corneal section, a conical scleral bearing section, a spherical section, said conical section being intermediate the other two sections and practically the entire area of the blank peripheral to the corneal section being of conical configuration.

6. A plastic blank, from which a contact lens is adapted to be cut, comprising a corneal section, a conical scleral bearing section, a spherical section, said conical section being intermediate the other two sections and the inner face of the junction between the corneal section and conical section being smooth and continuous and substantially the entire area of the blank peripheral to the corneal section being of substantially conical configuration.

7. A contact lens consisting of a corneal lens section and a scleral bearing section derived from a conical section, the inner surface of the junction of the two sections being smooth and continuous, a scleral flange depending from the scleral bearing section which has both nasal and temporal portions and practically the entire area of the lens peripheral to the corneal section being of conical configuration.

WILLIAM FEINBLOOM.

REFERENCES CITED

The following references are of record in the file of this patent:

UNITED STATES PATENTS

| Number | Name | Date |
|---|---|---|
| 1,921,972 | Fertsch et al. | Aug. 8, 1933 |
| 2,237,744 | Mullen | Aug. 8, 1941 |

FOREIGN PATENTS

| Number | Country | Date |
|---|---|---|
| 147,366 | Austria | Oct. 26, 1936 |
| 510,946 | Great Britain | Aug. 8, 1939 |

OTHER REFERENCES

"Contact Lenses" (Text), T. E. Obrig (1942), pub. by the Chilton Co., Philadelphia, Pa., pages 20 and 144 cited.